United States Patent
Dirauf et al.

(10) Patent No.: US 6,827,762 B2
(45) Date of Patent: Dec. 7, 2004

(54) SYSTEM FOR FLUE GAS PURIFICATION AND METHOD FOR INTRODUCING A PURIFYING AGENT

(75) Inventors: Peter Dirauf, Erlangen (DE); Wolfgang Kiefer, Erlangen (DE); Andreas Leuze, Effeltrich (DE); Peter Madl, Forchheim (DE); Jens Rosenkranz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 10/362,121

(22) PCT Filed: Aug. 8, 2001

(86) PCT No.: PCT/EP01/09179
§ 371 (c)(1),
(2), (4) Date: Feb. 21, 2003

(87) PCT Pub. No.: WO02/16013
PCT Pub. Date: Feb. 28, 2002

(65) Prior Publication Data
US 2003/0154864 A1 Aug. 21, 2003

(30) Foreign Application Priority Data
Aug. 21, 2000 (EP) .............................................. 00117951

(51) Int. Cl.$^7$ .............................................. B01D 53/06
(52) U.S. Cl. .............................. 95/107; 95/135; 96/151
(58) Field of Search .............................. 95/90, 107, 110, 95/113, 135–137; 96/108, 134, 138, 151; 210/193, 268, 281; 222/608, 611.1; 422/177

(56) References Cited

U.S. PATENT DOCUMENTS 3,039,655 A * 6/1962 Pfeuffer ..................... 406/14
3,928,005 A * 12/1975 Laslo ............................ 95/94
3,992,176 A * 11/1976 Bohne et al. .................. 95/107
4,009,102 A * 2/1977 Davis ......................... 210/675
4,165,289 A * 8/1979 Borst ......................... 210/669
4,273,652 A * 6/1981 Lucas et al. ................. 210/189
4,273,750 A * 6/1981 Hollett et al. .......... 423/244.01
6,196,014 B1 * 3/2001 Maeda ........................ 62/271
6,276,408 B1 * 8/2001 Lehman ...................... 141/100
6,555,014 B1 * 4/2003 Bremer et al. .............. 210/777
2003/0116508 A1 * 6/2003 Ballreich et al. ........... 210/739

FOREIGN PATENT DOCUMENTS

| DE | 33 38 445 A1 | * 5/1985 |
| DE | 39 25 818 A | 7/1991 |
| EP | 0623378 A1 | * 11/1994 |
| EP | 0 882 490 A | 9/1998 |
| FR | 2 633 585 A | 5/1990 |

* cited by examiner

Primary Examiner—Robert H. Spitzer
(74) Attorney, Agent, or Firm—Harness, Dickey & Pierce, P.L.C.

(57) ABSTRACT

A system is disclosed for flue gas purification and a method is disclosed for introducing a purifying agent. A purifying agent is introduced into the metering device of a system for flue gas purification in a simple and inexpensive manner. To this end, the system is provided with a collector that is adapted to receive a plurality of storage containers for the purifying agent and that is used to automatically displace the storage containers relative to the metering device. The automatic displaceability of the storage containers substantially reduces the number of interventions by the operating personnel.

20 Claims, 3 Drawing Sheets

SYSTEM FOR FLUE GAS PURIFICATION AND METHOD FOR INTRODUCING A PURIFYING AGENT

DESCRIPTION

Figure 1:
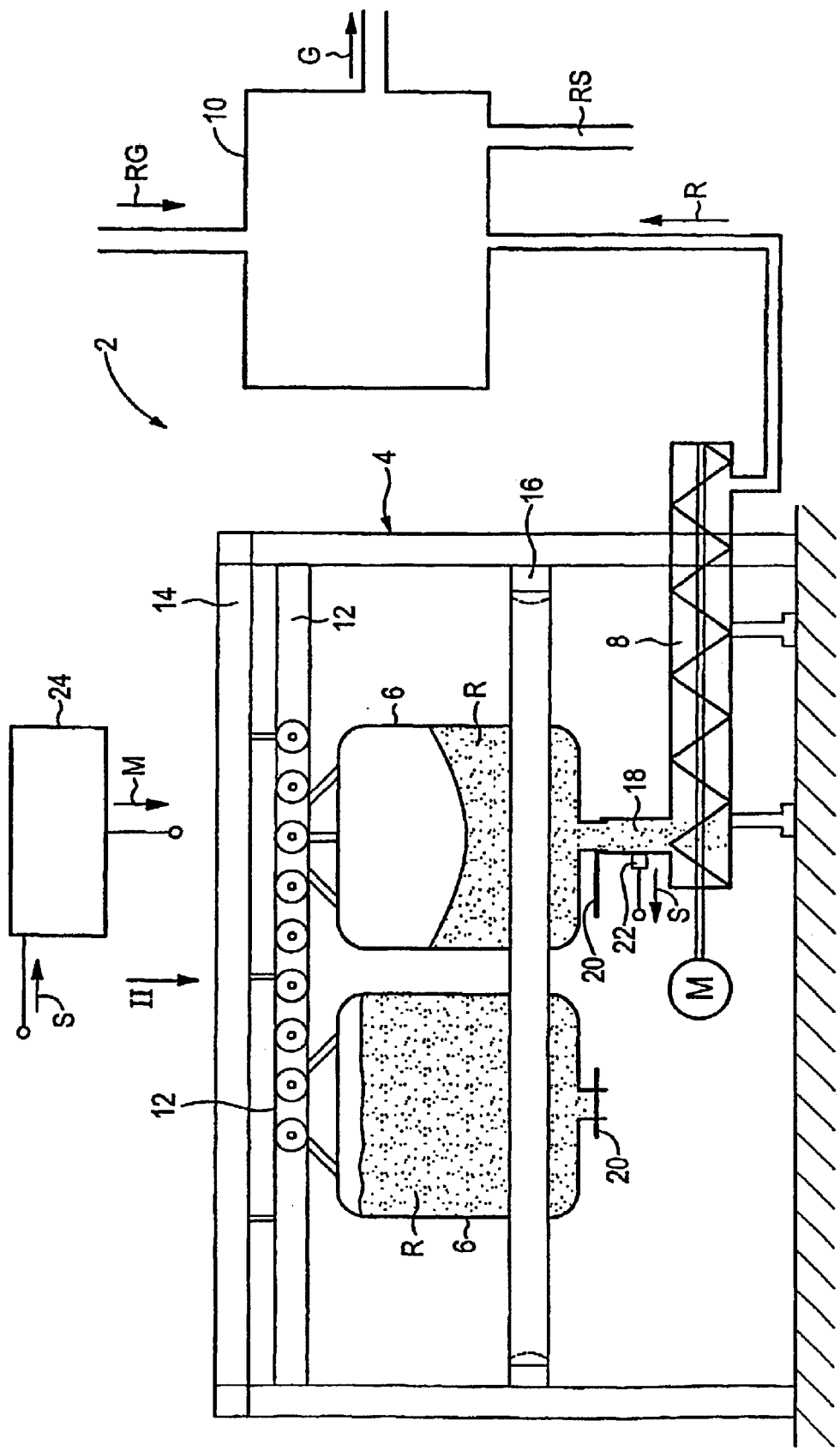

System for flue gas purification and a method for introducing a purifying agent.

The invention relates to a system for flue gas purification having a metering device for a purifying agent, and to a method for feeding a purifying agent for a system of this type for flue gas purification to a metering device.

In a system for flue gas purification, a consumable substance is generally used as purifying agent for purification of the flue gas. This substance is, for example, a sorbent, which is supplied as a bulk material. A typical example of a sorbent is, for example, what is known as oven coke. The purifying agent is generally supplied to the system in a storage container, which in the case of oven coke is typically what is known as a "big pack".

The purifying agent is fed to a purification unit in metered form. For this purpose, a metering device is provided. The purifying agent is in turn fed to this metering device via the storage container. The storage container is sufficiently large to cover the demand for a purifying agent for a relatively long period, for example a number of days. As soon as the purifying agent in a storage container has been consumed, this container has to be replaced with a full one. Because of the size of the storage container, this is generally carried out with the aid of a fork-lift truck, by means of which the full storage container is transferred to the metering device after the empty storage container has been removed. This takes up a considerable amount of time.

The present invention is based on the object of making it easy and inexpensive to change the storage containers.

According to the invention, the object is achieved by a system for flue gas purification, having a metering device for a purifying agent, which can be fed to the metering device from a storage container, in which system there is a collection device for receiving a plurality of storage containers, by means of which collection device the storage containers can automatically be moved to the metering device.

The option of automatic movement produces the advantage that a complex, time-consuming manual exchange of the storage containers is not required. At the same time, the number of interventions required on the part of the operating staff is significantly reduced, since a plurality of storage containers can be held in the collection device, so that overall the quantity of purifying agent in the collection device is sufficient for a very long period, during which no intervention is required on the part of the operating staff. At the same time, the need for an additional store next to the collection device is eliminated.

The collection device preferably has a conveyor unit for moving the storage containers. Therefore, the conveyor unit is used to convey the corresponding storage container out of the collection device or within the collection device to the metering device. This conveyor unit is preferably at the same time also used to automatically remove an empty storage container from the metering device. The collection device therefore fulfills a dual role, namely that of storing a plurality of containers and that of automatically conveying them.

According to an expedient configuration, the conveyor unit is designed as a distribution rail, from which the storage containers can be suspended. This makes it easy to move the storage containers. As an alternative to the distribution rail, the storage containers may also be placed onto a conveyor belt or conveyor rolls.

It is preferable for the conveyor unit to be of revolving design, in order to allow simple exchange, i.e. removal of the empty storage container and supplying of the full storage container.

As an alternative to the revolving design, the conveyor unit is preferably configured as a rotatable unit with load-bearing arms in the manner of a revolving magazine, in which case a storage container can be suspended from each of the load-bearing arms. Rotation of this rotatable unit results in the storage container being changed over.

To make it easy to feed the purifying agent to the metering device, the corresponding storage container can preferably be fed to the metering device from above, in order to make use of the force of gravity. Further auxiliary means or lifting tools for feeding the purifying agent to the metering device are not required.

To allow targeted supply of the corresponding storage container, there is a guide element for guiding the storage container during the movement to the metering device.

The purifying agent is preferably a bulk material. In particular, it is a sorbent, such as for example what is known as oven coke. The storage containers are preferably what are known as "big packs".

According to the invention, the object is also achieved by a method for supplying a purifying agent for a flue gas purification system to a metering device, in which a plurality of storage containers holding the purifying agent are received by a collection device, and a storage container is fed to the metering device automatically.

The advantages and preferred configurations which have been mentioned in connection with the system can be transferred mutatis mutandis to the method.

Figure 2:
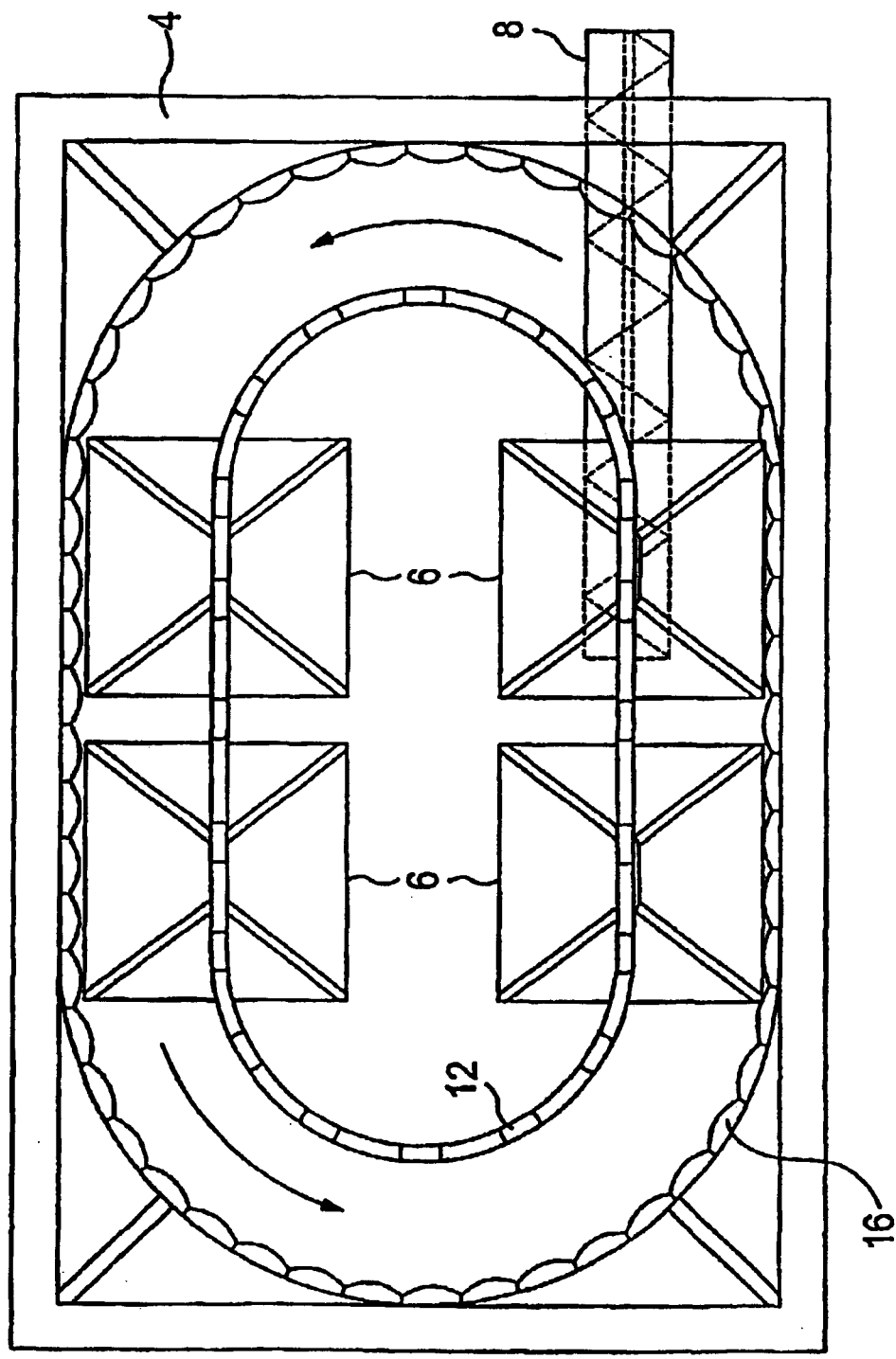
Figure 3:
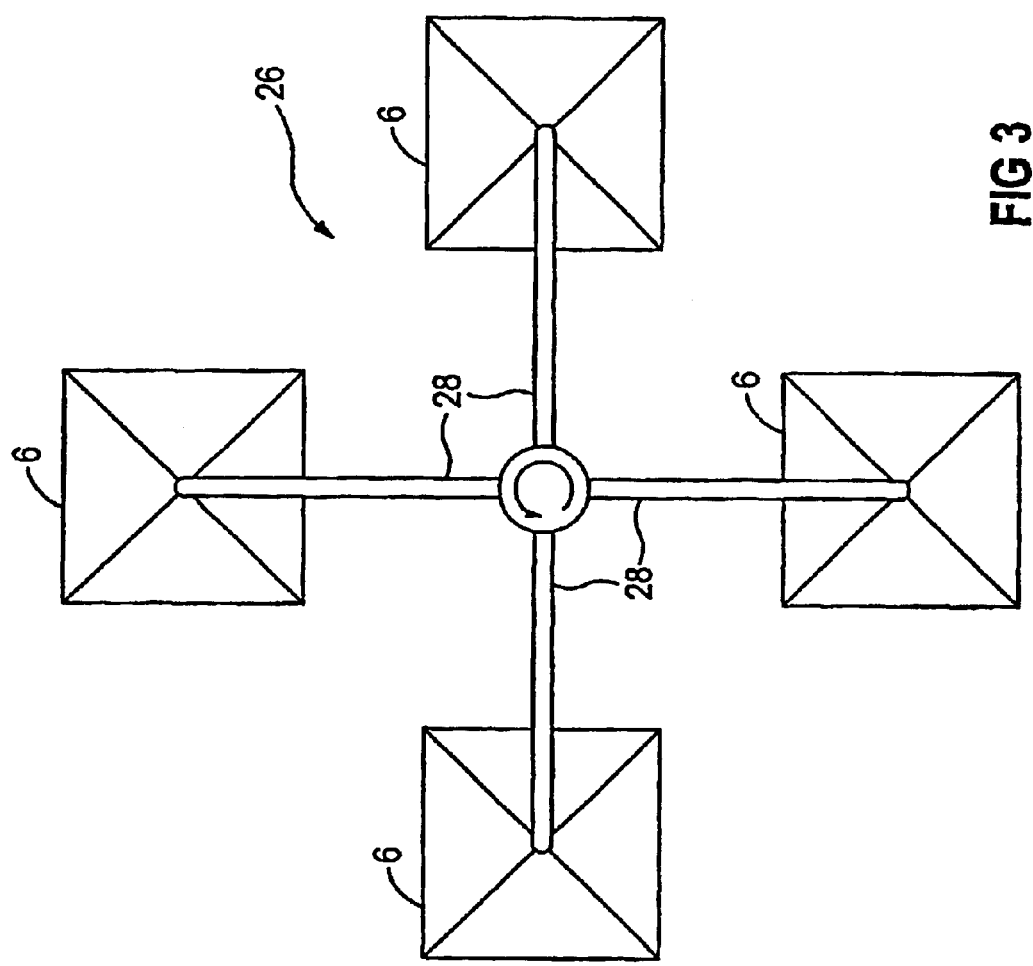

Exemplary embodiments of the invention are explained in more detail below with reference to the drawing, in which, in each case diagrammatically:

FIG. 1 shows a highly simplified illustration of a system for flue gas purification having a collection device, FIG. 2 shows a plan view of the collection device shown in FIG. 1, and FIG. 3 shows a further embodiment of a collection device.

A system for flue gas purification 2 as shown in FIG. 1 comprises a collection device 4, in which a plurality of storage containers 6, which are used to store a purifying agent R, are arranged. The system 2 also has a metering device 8, which is designed as a metering screw, and a flue-gas purification region 10, to which the purifying agent R is supplied from the metering device 8. The flue-gas purification region 10 generally comprises a multiplicity of components which interact in a system for flue gas purification 2 in order to purify a flue gas RG. This flue gas RG is fed to the flue-gas purification region 10 and leaves it as clean gas G. During the flue gas purification, the purifying agent R is consumed and a remainder material RS, which is discharged from the flue-gas purification region 10, is formed.

As can be seen from FIGS. 1 and 2, the storage containers 6 in the collection device 4 are suspended from a distribution rail 12, which is secured to a supporting structure 14. To guide the storage containers 6, there is a guide element 16 in the form of a guide rail or a guide bar. This guide element 16 ensures that the corresponding storage container 6, which is being fed to the metering device 8, is positioned accurately above a filling funnel 18 of the metering device 8. During the movement of the storage container 6 over the filling funnel 18, it is preferable for an outlet barrier 20, which in the closed position prevents the purifying agent R from escaping from the storage container 6, to be opened automatically.

As soon as the purifying agent R of the storage container 6 which is currently arranged above the metering device 8 has been consumed, the empty storage container 6 is automatically replaced with a full storage container 6. For this purpose, the storage containers 6 are moved along the distribution rail 12 with the aid of a motor drive (not shown in more detail). In this context, it is preferable for the distribution rail 12 to be designed as a revolving distribution rail 12, as can be seen from FIG. 2.

Expediently, the system automatically registers when the corresponding storage container 6 above the metering device 8 is empty. For this purpose, there is a suitable sensor element 22, which in the exemplary embodiment shown in FIG. 1 is designed as a filling-level measuring device on the filling funnel 18. Alternatively, it is also possible to design this sensor element 22 as a weight sensor and to arrange it, for example, on the distribution rail 12, in order to measure the weight of the corresponding storage container 6. The sensor element 22 emits a sensor signal S to a control unit 24, which transmits a motor signal M to the motor (not shown) for the distribution rail 12, in order to activate the motor when the storage container 6 is empty.

A system 2 of this type has the significant advantage that, firstly, the purifying agent R is fed to the metering device 8 automatically. If the control device 24 and the sensor elements 22 are provided, the supply of the purifying agent R to the metering device 8 is fully automated. Consequently, there is no need for any intervention on the part of the operating staff, and changing the storage container 6 is an inexpensive operation. Secondly, there is no need for an additional store, since the collection device 4 holds a number of storage containers 6.

As an alternative to the revolving distribution rail 12 illustrated in FIGS. 1 and 2 as the conveyor unit, a conveyor unit as shown in FIG. 3 is designed as a rotatable unit 26 having, in the exemplary embodiment, four load-bearing arms 28. Once again, the storage containers 6 are suspended from the load-bearing arms. The storage containers 6 are exchanged by way of a rotation of the rotatable unit 26.

What is claimed is:

1. A method for supplying a purifying agent for a flue gas purification system to a metering device, comprising:

receiving a plurality of storage containers holding the purifying agent by a collection device; and feeding a storage container to the metering device automatically.

2. The method of claim 1, wherein the purifying agent of the storage container is adapted to be fed to the metering device from above.

3. A system for flue gas purification, comprising:

a metering device for a purifying agent, wherein the purifying agent is adapted to be fed to the metering device from a storage container; and a collection device for receiving a plurality of storage containers, the collection device be adapted to automatically move the storage containers to the metering device.

4. The system as claimed in claim 3, wherein the collection device includes a conveyor unit for moving the storage containers.

5. The system as claimed in claim 4, wherein the conveyor unit is designed as a distribution rail, from which the storage containers are adapted to be suspended.

6. The system as claimed in claim 5, wherein the conveyor unit is of revolving design.

7. The system as claimed in claim 5, wherein the conveyor unit is configured as a rotatable unit with load-bearing arms, from each of which a storage container is adapted to be suspended.

8. The system as claimed in claim 4, wherein the conveyor unit is of revolving design.

9. The system as claimed in claim 4, wherein the conveyor unit is configured as a rotatable unit with load-bearing arms, from each of which a storage container is adapted to be suspended.

10. The system as claimed in claim 4, wherein the purifying agent of the storage container is adapted to be fed to the metering device from above.

11. The system as claimed in claim 4, further comprising:

a guide element for guiding at least one of the plurality of storage containers during its movement to the metering device.

12. The system as claimed in claim 4, wherein the purifying agent is a bulk material.

13. The system as claimed in claim 3, wherein the purifying agent of the storage container is adapted to be fed to the metering device from above.

14. The system as claimed in claim 3, further comprising:

a guide element for guiding at least one of the plurality of storage containers during its movement to the metering device.

15. The system as claimed in claim 3, wherein the purifying agent is a bulk material.

16. A system for flue gas purification, comprising:

metering means for receiving a purifying agent, wherein the purifying agent is adapted to be fed to the metering means from a storage container; and collection means for receiving a plurality of storage containers and for automatically moving the storage containers to the metering means.

17. The system as claimed in claim 16, wherein the collection means includes conveying means for moving the storage containers.

18. The system as claimed in claim 17, wherein the conveying means includes a distribution rail, from which the storage containers are adapted to be suspended.

19. The system as claimed in claim 17, wherein the conveying means is of revolving design.

20. The system as claimed in claim 17, wherein the conveying means is configured as a rotatable unit with load-bearing arms, from each of which a storage container is adapted to be suspended.

* * * * *